United States Patent
Chen et al.

(10) Patent No.: US 12,520,219 B2
(45) Date of Patent: Jan. 6, 2026

(54) METHODS, DEVICES, AND COMPUTER READABLE MEDIUM FOR COMMUNICATION

(71) Applicant: NEC CORPORATION, Tokyo (JP)

(72) Inventors: Zhe Chen, Beijing (CN); Da Wang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 335 days.

(21) Appl. No.: 18/270,004

(22) PCT Filed: Dec. 28, 2020

(86) PCT No.: PCT/CN2020/140253
§ 371 (c)(1),
(2) Date: Jun. 28, 2023

(87) PCT Pub. No.: WO2022/140938
PCT Pub. Date: Jul. 7, 2022

(65) Prior Publication Data
US 2024/0064601 A1 Feb. 22, 2024

(51) Int. Cl.
*H04W 36/36* (2009.01)
*H04W 36/00* (2009.01)
*H04W 36/08* (2009.01)

(52) U.S. Cl.
CPC ..... *H04W 36/362* (2023.05); *H04W 36/0064* (2023.05); *H04W 36/08* (2013.01)

(58) Field of Classification Search
CPC ........... H04W 36/362; H04W 36/0064; H04W 36/08
See application file for complete search history.

(56) References Cited

U.S. PATENT DOCUMENTS

2023/0247514 A1* 8/2023 Li ..................... H04W 84/047
2023/0269630 A1* 8/2023 Teyeb ............... H04W 36/0033
370/331

FOREIGN PATENT DOCUMENTS

| CN | 111757362 A | 10/2020 |
|---|---|---|
| WO | 2020/057732 A1 | 3/2020 |
| WO | 2020/090987 A1 | 5/2020 |
| WO | 2020/222904 A1 | 11/2020 |

OTHER PUBLICATIONS

Fujitsu, "CHO for UE or IAB-MT on migration", 3GPP TSG-RAN WG2, R2-2009007, Meeting #112 electronic, Nov. 2nd-13, pp. 1-3.
International Search Report for PCT/CN2020/140253 dated Sep. 28, 2021 [PCT/ISA/210].
Office Action issued Feb. 18, 2025 in Japanese Application No. 2023-539294.

* cited by examiner

*Primary Examiner* — Khoa Huynh
(74) *Attorney, Agent, or Firm* — Sughrue Mion, PLLC

(57) ABSTRACT

According to embodiments of the present disclosure, a first device receives first information from a second device. The first information is associated with a conditional handover through a source Integrated Access Backhaul (IAB) node to a target IAB node. If the conditional handover is completed at an ancestor IAB node, the first device transmits, to the second device, second information associated with the conditional handover. In this way, it avoids the child IAB node performs the handover before its parent IAB node.

11 Claims, 11 Drawing Sheets

METHODS, DEVICES, AND COMPUTER READABLE MEDIUM FOR COMMUNICATION

CROSS REFERENCE TO RELATED APPLICATIONS

This application is a National Stage of International Application No. PCT/CN2020/140253 filed Dec. 28, 2020.

TECHNICAL FIELD

Embodiments of the present disclosure generally relate to the field of telecommunication, and in particular, to methods, devices, and computer readable medium for communication.

BACKGROUND

In communication networks, a base station generally has a limited reach, to achieve connectivity between mobile devices. A technology of handover has been proposed, which is a process in telecommunication and mobile communication in which cellular transmission is transferred from one base station to another base station without losing connectivity to the cellular transmission. Handover is a core element in deploying mobile transmission as it creates data sessions or connects phone calls between mobile devices which are constantly on the move.

SUMMARY

In general, example embodiments of the present disclosure provide a solution for communication.

In a first aspect, there is provided a method for communication. The method comprises receiving, at a first device and from a second device, first information associated with a conditional handover through a source Integrated Access Backhaul (IAB) node to a target IAB node; and in accordance with a determination that the conditional handover is completed at an ancestor IAB node, transmitting, to a third device, second information associated with the conditional handover.

In a second aspect, there is provided a method for communication. The method comprises transmitting, at a second device and to a first device, first information associated with a conditional handover configuration from a source Integrated Access Backhaul (IAB) node to a target IAB node.

In a third aspect, there is provided a method for communication. The method comprises in accordance with a determination that a conditional handover from a source Integrated Access Backhaul (IAB) node to a target IAB node is completed at an ancestor IAB node, receiving, and from a second device, second information associated with the conditional handover.

In a fourth aspect, there is provided a first device. The first device comprises a processing unit; and a memory coupled to the processing unit and storing instructions thereon, the instructions, when executed by the processing unit, causing the first device to perform acts comprising: receiving, at a first device and from a second device, first information associated with a conditional handover through a source Integrated Access Backhaul (IAB) node to a target IAB node; and in accordance with a determination that the conditional handover is completed at an ancestor IAB node, transmitting, to a third device, second information associated with the conditional handover.

In a fifth aspect, there is provided a second device. The second device comprises a processing unit; and a memory coupled to the processing unit and storing instructions thereon, the instructions, when executed by the processing unit, causing the second device to perform acts comprising: transmitting, at a second device and to a first device, first information associated with a conditional handover from a source Integrated Access Backhaul (IAB) node to a target IAB node.

In a sixth aspect, there is provided a third device. The third device comprises a processing unit; and a memory coupled to the processing unit and storing instructions thereon, the instructions, when executed by the processing unit, causing the third device to perform acts comprising: in accordance with a determination that a conditional handover from a source Integrated Access Backhaul (IAB) node to a target IAB node is completed at an ancestor IAB node, receiving, and from a second device, second information associated with the conditional handover.

In a seventh aspect, there is provided a computer readable medium having instructions stored thereon, the instructions, when executed on at least one processor, causing the at least one processor to carry out the method according to any one of the first aspect, second or third aspect.

Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
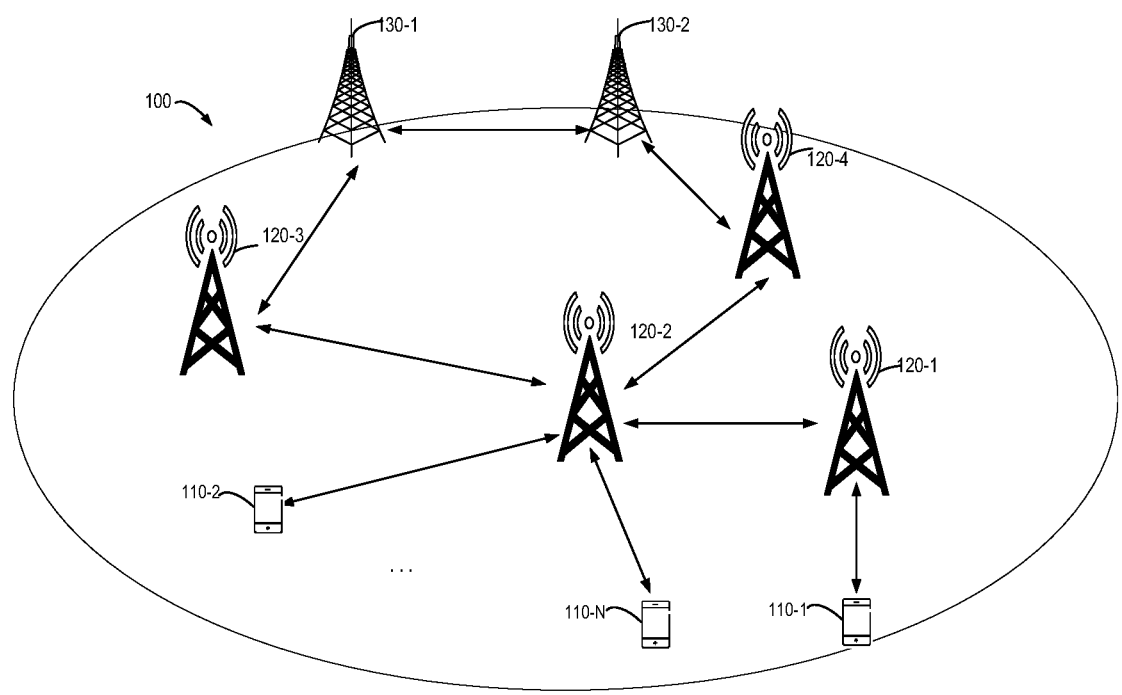
FIG. 1 is a schematic diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, a satellite network device, an aircraft network device, and the like. For the purpose of discussion, in the following, some example embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. In the following description, the terms "terminal device", "communication device", "terminal", "user equipment" and "UE" may be used interchangeably.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, a first information may be transmitted to the terminal device from the first network device and a second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

Communications discussed herein may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.85G, the third generation (3G), the fourth generation (4G), 4.5G, the fifth generation (5G), and the sixth (6G) communication protocols. The techniques described herein may be used for the wireless networks and radio technologies mentioned above as well as other wireless networks and radio technologies.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

According to conventional technologies, conditional handover (CHO) has been introduced to reduce the service interruption and reduce the radio link failure (RLF) possibility. The network provides CHO triggering criteria, with the radio configuration of potential target gNBs. When the UE evaluates the criteria of the target gNB is fulfilled, the UE may complete the handover on its own, with a notification to the target gNB by RRCReconfigurationComplete message.

Further, the introduction of inter-donor Integrated Access Backhaul (IAB)-node migration increases robustness and allows for more refined load-balancing and topology management. Reduction of service interruption time caused by IAB-node migration and backhaul (BH) RLF recovery improves network performance and allows network deployments to undergo more frequent topology changes, and provides stable backhaul performance.

However, IN the multi-hop IAB architecture, if the handover message for a descendant node or a UE is received before the CHO message is completed for the parent node or access node, then the descendant node or UE will apply the new security key of the target donor CU, but the parent node or the access node will deliver the UL packet to the source donor CU.

In order to solve at least part of above and potential problems, a solution of handover is proposed. The conditions in CHO for descendent IAB-nodes or UEs are not fulfilled when their parent IAB-node is performing migration. So in order to align the new security key of the target Donor CU, the descendent IAB-nodes/UEs should perform reconfiguration/CHO to communicate with the new CU correctly after their parent IAB-node's inter-CU migration. According to embodiments of the present disclosure, a first device receives first information from a second device. The first information is associated with a conditional handover through a source Integrated Access Backhaul (IAB) node to a target IAB node. If the conditional handover is completed at an ancestor IAB node, the first device transmits, to the second device, second information associated with the conditional handover. In this way, it avoids the child IAB node performs the handover before its parent IAB node.

FIG. 1 illustrates a schematic diagram of a communication system in which embodiments of the present disclosure can be implemented. The communication system 100, which is a part of a communication network, comprises a terminal device 110-1, a terminal device 110-2, . . . , a terminal device 110-N, which can be collectively referred to as "terminal device(s) 110." The number N can be any suitable integer number.

The communication system 100 further comprises a IAB node 120-1, a IAB node 120-2, a IAB node -3, a IAB node 4, . . . , a IAB node-M (not shown) which can be collectively referred to as "IAB node(s) 120." In some embodiments, the IAB node may be any suitable network device. The number M can be any suitable integer number. As shown in FIG. 1, the communication system 100 may also a donor 130-1 and a donor 130-3. It should be noted that the number of donors shown in FIG. 1 is only an example. In the communication system 100, the IAB node 120 and the terminal devices 110 can communicate data and control information to each other. The IAB nodes 120 can communicate with each other. The donor CUs can also communicate with the IAB nodes 120. Only for the purpose of illustrations, the IAB node 120-2 can be handed over from the IAB node 120-3 to the IAB node 120-3. Thus, the IAB node 120-3 can be regarded as a source IAB node and the IAB node 120-4 can be regarded as a target IAB node. The donor 130-1 connects with the IAB node 120-2 and the donor 130-2 connects with the IAB node 120-4. According to the topology shown in FIG. 1, the IAB node can be regarded an ancestor/parent node of the IAB node 120-1 and the terminal devices 110. In other words, the IAB node 120-1 and the terminal devices 110 can be regarded as descendant/child node of the IAB node 120-2. The numbers of devices shown in FIG. 1 are given for the purpose of illustration without suggesting any limitations.

Communications in the communication system 100 may be implemented according to any proper communication protocol(s), comprising, but not limited to, cellular communication protocols of the first generation (1G), the second generation (2G), the third generation (3G), the fourth generation (4G), the fifth generation (5G) and the sixth generation (6G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Embodiments of the present disclosure can be applied to any suitable scenarios. For example, embodiments of the present disclosure can be implemented at reduced capability NR devices. Alternatively, embodiments of the present disclosure can be implemented in one of the followings: NR multiple-input and multiple-output (MIMO), NR sidelink enhancements, NR systems with frequency above 52.6 GHz, an extending NR operation up to 71 GHz, narrow band-Internet of Thing (NB-IOT)/enhanced Machine Type Communication (eMTC) over non-terrestrial networks (NTN), NTN, UE power saving enhancements, NR coverage enhancement, NB-IoT and LTE-MTC, Integrated Access and Backhaul (IAB), NR Multicast and Broadcast Services, or enhancements on Multi-Radio Dual-Connectivity.

The term "slot" used herein refers to a dynamic scheduling unit. One slot comprises a predetermined number of symbols. The term "downlink (DL) sub-slot" may refer to a virtual sub-slot constructed based on uplink (UL) sub-slot. The DL sub-slot may comprise fewer symbols than one DL slot. The slot used herein may refer to a normal slot which comprises a predetermined number of symbols and also refer to a sub-slot which comprises fewer symbols than the predetermined number of symbols.

In some embodiments, the donor 130-1 can only provide CHO configuration to the IAB node 120-2 only if donor 130-1 hasn't received any measurement reports from any descendant node/UE of the IAB node 120-2 during the past T period. If the IAB node 120-4 has an connection to the donor 130-1, the IAB node 120-2 may transmit data through the path from the IAB node 120-4 to the donor 130-1. In some embodiments, the terminal device 110-1 may transmit data to the IAB node 120-2. Before the IAB node 120-2 transmits the data to the IAB node 120-3, the IAB node 120-2 may handover to the IAB node 120-4. The IAB node 120-2 may transmit the data to the IAB node 120-4 and the IAB node may transmit the data to the donor 130-1.

Figure 2:
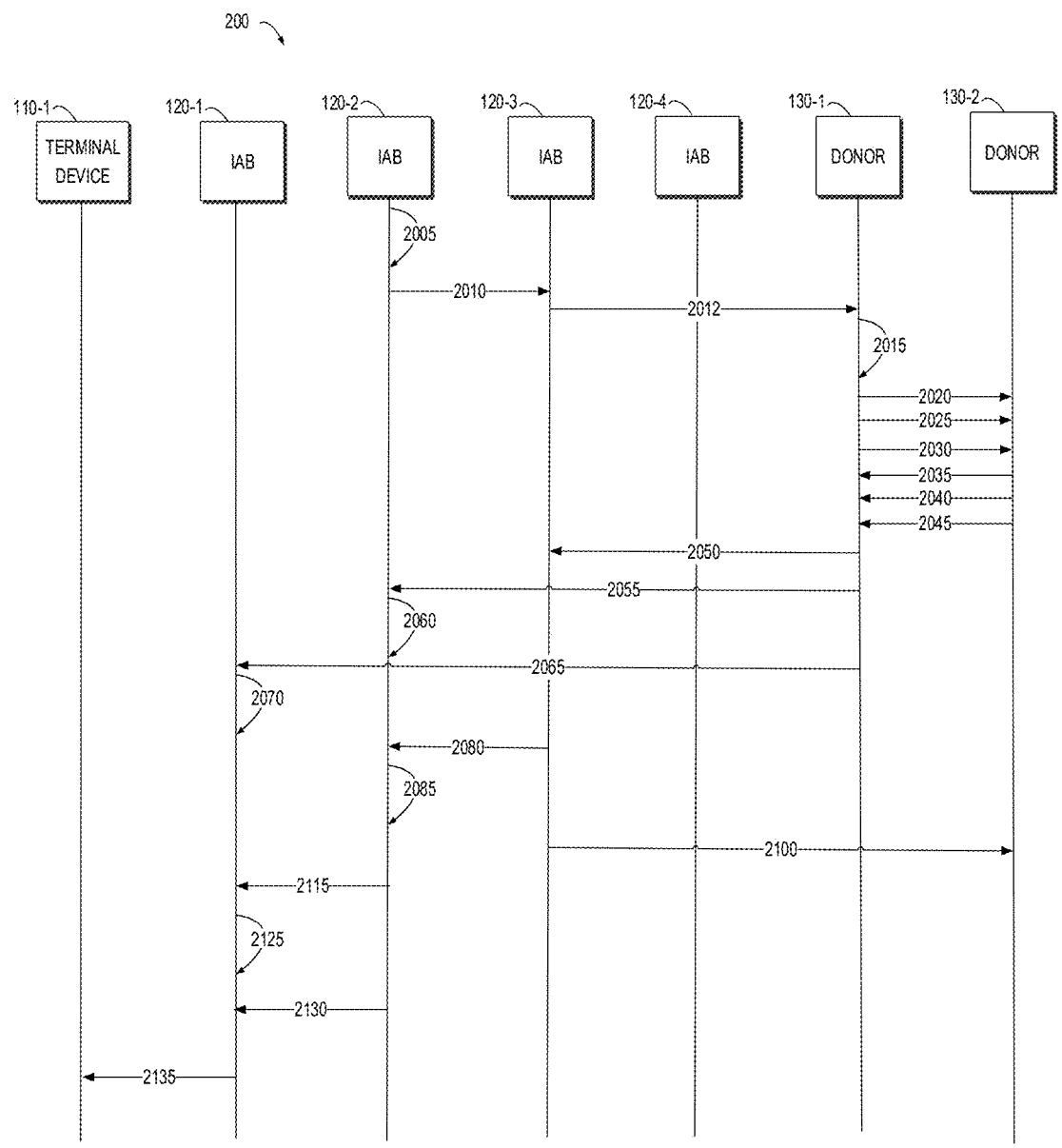
FIG. 2 illustrates a signaling flow for handover according to some embodiments of the present disclosure.

Embodiments of the present disclosure will be described in detail below. Reference is first made to FIG. 2, which shows a signaling chart illustrating process 200 among devices according to some example embodiments of the present disclosure. Only for the purpose of discussion, the process 200 will be described with reference to FIG. 1. The process 200 may involve the terminal device 110-1, the IAB node 120-1, the IAB node 120-2, the IAB node 120-3, the IAB node 120-4, the donor 130-1 and the donor 130-2 in FIG. 1. FIG. 2 shows the process 200 according to embodiments of the present disclosure where an ancestor IAB node is able to control the CHO.

The IAB node 120-2 may perform 2005 measurements for the IAB node 120-3 (i.e., the source IAB node) and the IAB node 120-4 (i.e., the target IAB node). The IAB node 120-2 may transmit 2010 the measurement report about the IAB nodes 120-3 and 120-4 to the IAB node 120-3. For example, the measurement report can be transmitted via Radio Resource Control signaling. The IAB node 120-2 may perform any suitable measurement events. For example, the IAB node 120-2 may perform Event A3 where a neighbor cell becomes offset better than a serving cell. Alternatively, the IAB node 120-2 may perform any one of: Event A1 where a serving cell becomes better than a threshold, Event A2 where the serving cell becomes worse than a threshold, Event A4 where the neighbor cell becomes better than a threshold, Event A5 wherein the serving cell becomes worse than threshold 1 and the neighbor cell becomes better than threshold A2, Event B1 wherein inter RAT neighbor becomes better than a threshold, and Event B2 where the serving cell becomes worse than threshold 1 and inter RAT neighbor becomes better than threshold 2. In some embodiments, the IAB node 120-2 may measure a reference signal received power. Alternatively, the IAB node 120-2 may measure a reference signal receiving quality. The IAB node 120-2 may measure any suitable parameters.

The IAB node 120-2 may encapsulate the RRC message into a F1-AP message. The IAB node 120-3 may transfer 2012 the F1-AP message which comprises the RRC container which contains the measurement report to the donor 130-1. The donor 130-1 may make 2015 the conditional handover decision. For example, the donor 130-1 may determine that the IAB node 120-2 needs to be handed over from the IAB node 120-3 to the IAB node 120-4. Further, the donor 130-1 may also determine that one or more descendant nodes (for example, the IAB node 120-1 and the terminal device 110-1) of the IAB node 120-2 need to be handed over from the IAB node 120-3 to the IAB node 120-4.

The donor 130-1 may transmit 2020 a handover request for the IAB node 120-2 to the donor 130-2. The donor 130-1 may transmit 2025 a handover request for the IAB node 120-1 to the donor 130-2. The donor 130-1 may transmit 2030 a handover request for the terminal device 110-1 to the donor 130-2.

The donor 130-2 may transmit 2035 a handover request acknowledgment to the donor 130-1 for the IAB node 120-2. The donor 130-2 may transmit 2040 a handover request acknowledgment to the donor 130-1 for the IAB node 120-1. The donor 130-2 may transmit 2045 a handover request acknowledgment to the donor 130-1 for the terminal device 110-1.

The donor 130-1 may transmit 2050 downlink RRC message transfer to the IAB node 120-3. The donor 130-1 may transmit 2055 DL RRC message (i.e., the first information) to the IAB node 120-1. The first information may comprise one or more of: a radio configuration of the donor 130-2 (i.e., the target donor) of the IAB node 120-4 (i.e., the target IAB node), an identity of a descendant node (for example, the IAB node 120-1) of the IAB node 120-2, or an indication of the CHO to be performed at the ancestor IAB node (for example, the IAB node 120-2). After receiving the DL RRC message with the CHO indication, the IAB 120-2 may hold 2060 the RRC message.

The donor 130-1 may transmit 2065 the DL RRC message to the IAB node 120-1 for the terminal device 110-1. The DL RRC message may comprise one or more of: a radio configuration of the donor 130-2 (i.e., the target donor) of the IAB node 120-4 (i.e., the target IAB node), an identity of a descendant node (for example, the terminal device 110-1) of the IAB node 120-1, or an indication of the CHO to be performed at the ancestor IAB node (for example, the IAB node 120-2). After receiving the DL RRC message with the CHO indication, the IAB 120-1 may hold 2070 the RRC message.

The IAB node 120-3 may transmit 2080 RRCReconfiguration to the IAB node 120-2. The RRCReconfiguration may comprise the CHO execution condition.

The IAB node 120-2 may receive a configuration from the donor 130-1. The configuration may comprise a condition for performing the conditional handover. The condition may be any suitable conditions for triggering handover. If the condition is fulfilled, the IAB node 120-2 may perform 2085 handover from the IAB node 120-3 to the IAB node 120-4. After the CHO is completed at the IAB node 120-2, the IAB node 120-2 may transmit 2100 RRCReconfigurationComplete to the donor 130-2.

After CHO procedure is completed at the IAB node 120-2, the IAB node 120-2 may transmit 2115 the RRCReconfiguration message to the IAB node 120-1. The IAB node 120-1 may apply 2125 the radio configuration of the donor 130-2.

Alternatively or in addition, after the CHO is completed, the IAB node 120-2 may transmit 2130 a message to the IAB node 120-1 to indicate the completion of the CHO at the IAB node 120-2. For example, the message may be a backhaul adaption protocol (BAP) message.

The IAB node 120-1 may transmit 2135 the RRCReconfiguration to the terminal device 110-1. For example, the IAB node 120-1 may release the RRCReconfiguration to the terminal device 110-1 after receiving the RRCReconfiguration from the IAB node 120-2. Alternatively, the RRCReconfiguration can be released to the terminal device 110-1 after the BAP message.

Figure 3:
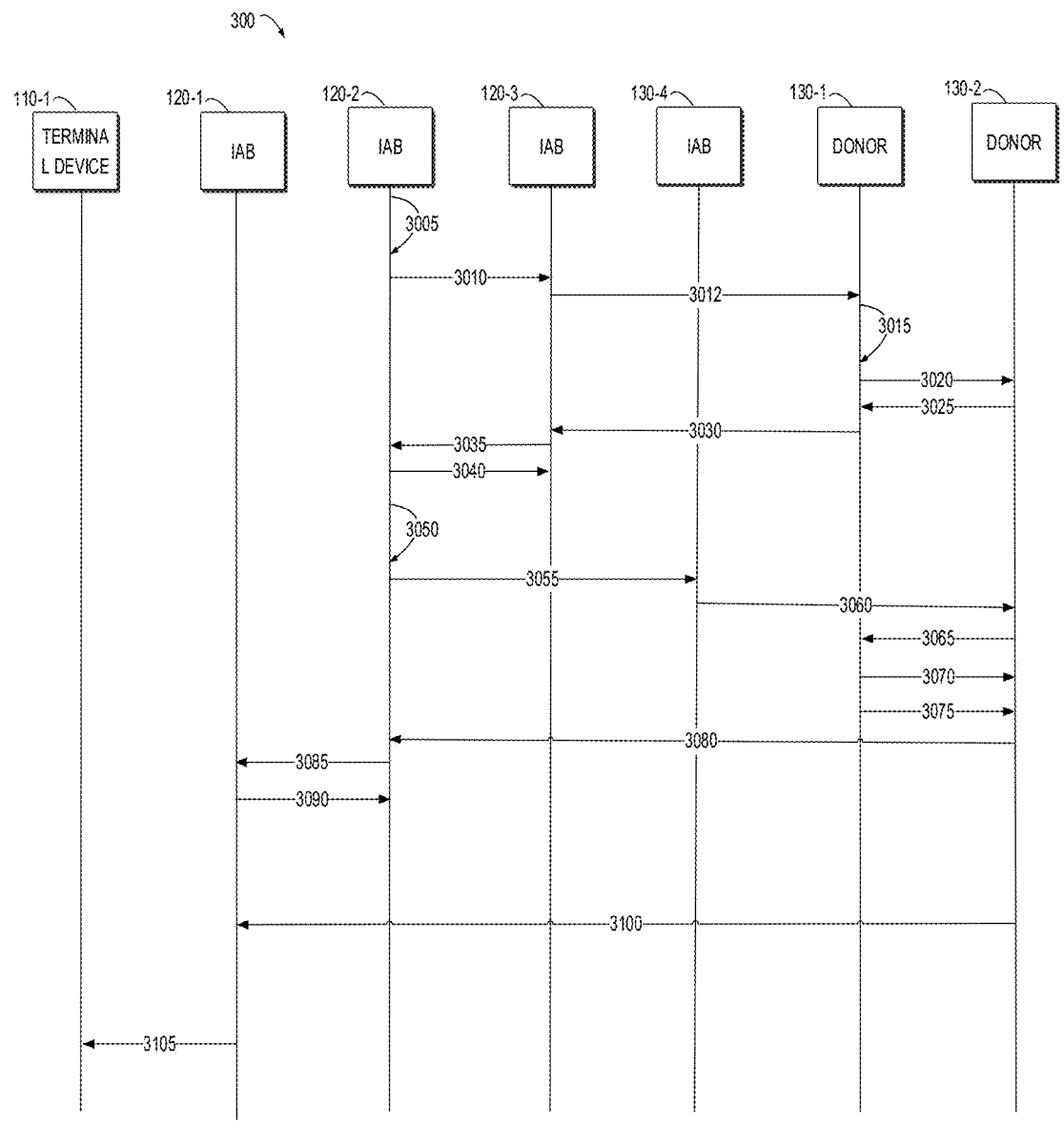
FIG. 3 illustrates a signaling flow for handover according to some embodiments of the present disclosure.

Embodiments of the present disclosure will be described in detail below. Reference is first made to FIG. 3, which shows a signaling chart illustrating process 300 among devices according to some example embodiments of the present disclosure. Only for the purpose of discussion, the process 300 will be described with reference to FIG. 1. The process 300 may involve the terminal device 110-1, the IAB node 120-1, the IAB node 120-2, the IAB node 120-3, the IAB node 120-4, the donor 130-1 and the donor 130-2 in FIG. 1. FIG. 3 shows the process 300 according to embodiments of the present disclosure where the source donor is able to control the CHO.

The IAB node 120-2 may perform 3005 measurements for the IAB node 120-3 (i.e., the source IAB node) and the IAB node 120-4 (i.e., the target IAB node). The IAB node 120-2 may transmit 3010 the measurement report about the IAB nodes 120-3 and 120-4 to the IAB node 120-3. For example, the measurement report can be transmitted via Radio Resource Control signaling. The IAB node 120-2 may perform any suitable measurement events. For example, the IAB node 120-2 may perform Event A3 where a neighbor cell becomes offset better than a serving cell. Alternatively, the IAB node 120-2 may perform any one of: Event A1 where a serving cell becomes better than a threshold, Event A2 where the serving cell becomes worse than a threshold, Event A4 where the neighbor cell becomes better than a threshold, Event A5 wherein the serving cell becomes worse than threshold 1 and the neighbor cell becomes better than threshold A2, Event B1 wherein inter RAT neighbor becomes better than a threshold, and Event B2 where the serving cell becomes worse than threshold 1 and inter RAT neighbor becomes better than threshold 2. In some embodiments, the IAB node 120-2 may measure a reference signal received power. Alternatively, the IAB node 120-2 may measure a reference signal receiving quality. The IAB node 120-2 may measure any suitable parameters.

The IAB node 120-2 may encapsulate the RRC message into a F1-AP message. The IAB node 120-3 may transfer 3012 the F1-AP message UL RRC message transfer which contains the RRC container which comprises the measurement report to the donor 130-1. The donor 130-1 may make 3015 the conditional handover decision. For example, the donor 130-1 may determine that the IAB node 120-2 needs to be handed over from the IAB node 120-3 to the IAB node 120-4. Further, the donor 130-1 may also determine that one or more descendant nodes (for example, the IAB node 120-1 and the terminal device 110-1) of the IAB node 120-2 need to be handed over from the IAB node 120-3 to the IAB node 120-4.

The donor 130-1 may transmit 3020 a handover request for the IAB node 120-2 to the donor 130-2. The donor 130-1 may hold handover requests for descendant nodes (for example, the IAB node 120-1 and the terminal device 110-1) of the IAB node 120-2. The donor 130-2 may transmit 3025 a handover request acknowledgment to the donor 130-1 for the IAB node 120-2.

The donor 130-1 may transmit 3030 downlink RRC message transfer to the IAB node 120-3. The IAB node 120-3 may transmit 3035 the RRCReconfiguration to IAB node 120-1. The IAB node 120-1 may transmit 3040 RRCReconfigurationComplete message to IAB node 120-3.

The IAB node 120-2 may receive a configuration from the donor 130-1. The configuration may comprise a condition for performing the conditional handover. The condition may be any suitable conditions for triggering handover. If the condition is fulfilled, the IAB node 120-2 may perform 3050 handover from the IAB node 120-3 to the IAB node 120-4. The IAB node 120-2 may transmit a RRCReconfigurationComplete message to the donor 130-2. For example, the IAB node 120-2 may transmit 3055 the RRCReconfigurationComplete to the IAB node 130-4 and the IAB node 130-4 may transfer 3060 a F1-AP message which comprises the RRC container which contains the RRCReconfigurationComplete message to the donor 130-2.

The donor 130-2 may transmit 3065 a handover success message to the donor 130-1. After the reception of the handover success message from the donor 130-2, the donor 130-1 may transmit 3070 the handover request for the IAB node 120-1. The handover request may comprise one or more of: an identity of the IAB node 120-1, security information of the donor 130-1, and the BH routing information. With the routing information, the donor 130-2 can find the path to reach the IAB 120-2. With the security information of the donor 130-1, the donor 130-2 can send RRC message to the IAB node 120-1.

The donor 130-1 may transmit 3075 the handover request for the terminal device 110-1. The handover request may comprise one or more of: an identity of the terminal device 110-1, security information of the donor 130-1, and an address of the terminal device 110-1. With the address, the donor 130-2 can find the path to reach the terminal device 110-1. With the security information of the donor 130-1, the donor 130-2 may send RRC message to the terminal device 110-1.

The donor 130-2 may transmit 3080 DL RRC message transfer to IAB node 120-2. The donor 130-2 may skip responding handover request Ack to the donor 130-1. The IAB node 120-2 may transmit 3085 RRCReconfiguration to the IAB node 120-1. The IAB node 120-1 may transmit 3090 a RRCReconfiguraiton complete to the IAB node 120-2.

Upon the reception of handover request from the donor 120-1 with the address, the donor 130-2 may transmit 3100 DL RRC message associated with the terminal device 110-1 to the IAB node 130-1. The donor 130-2 may skip responding handover request Ack to the donor 130-1. The IAB node 120-1 may transmit 3105 the RRCReconfiguration to the terminal device 110-1. The RRCReconfiguration may comprise the configuration of the CHO.

Figure 4:
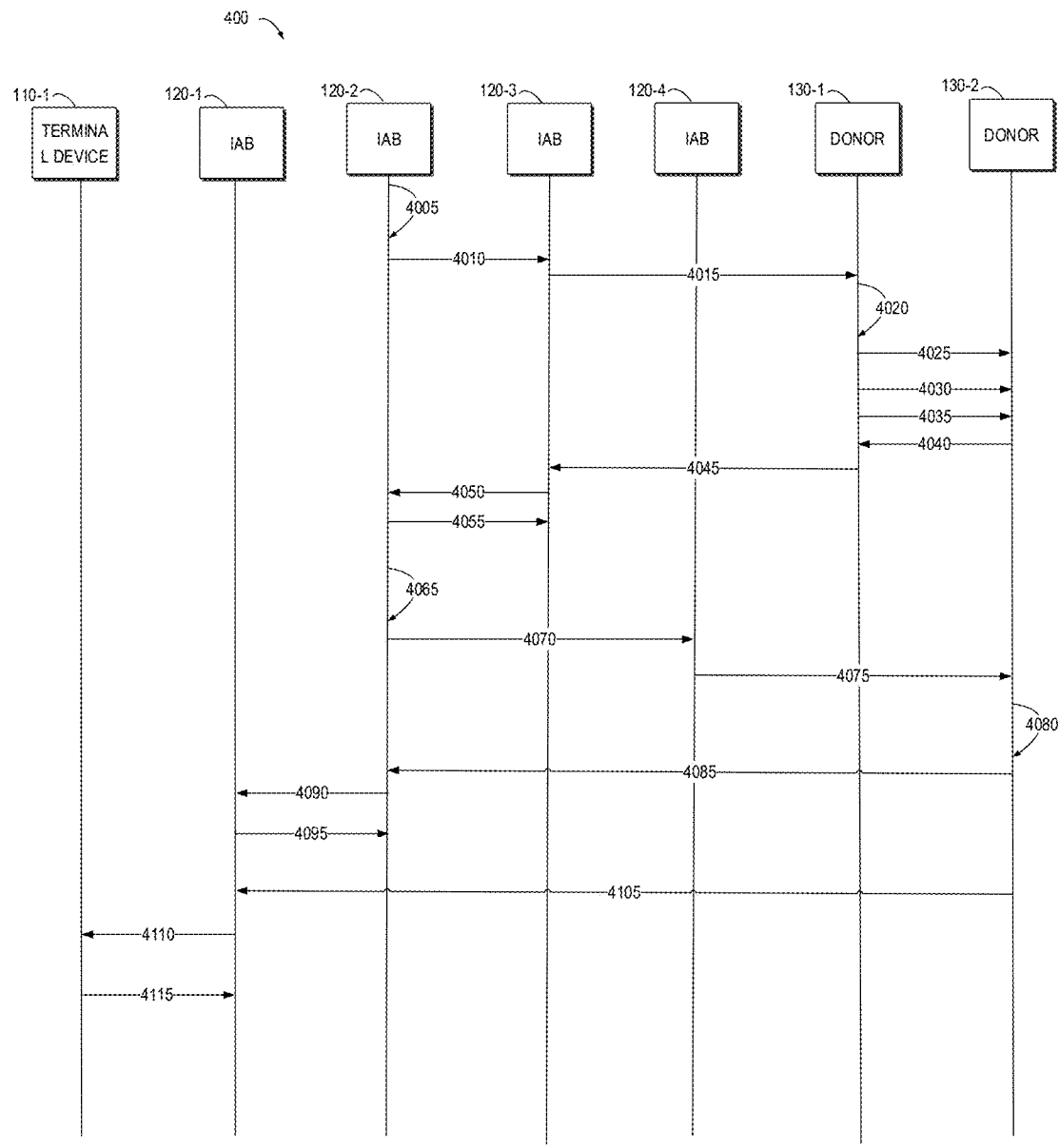
FIG. 4 illustrates a signaling flow for handover according to some embodiments of the present disclosure.

Embodiments of the present disclosure will be described in detail below. Reference is first made to FIG. 4, which shows a signaling chart illustrating process 400 among devices according to some example embodiments of the present disclosure. Only for the purpose of discussion, the process 400 will be described with reference to FIG. 1. The process 400 may involve the terminal device 110-1, the IAB node 120-1, the IAB node 120-2, the IAB node 120-3, the IAB node 120-4, the donor 130-1 and the donor 130-2 in FIG. 1. FIG. 4 shows the process 400 according to embodiments of the present disclosure where the target donor is able to control the CHO.

The IAB node 120-2 may perform 4005 measurements for the IAB node 120-3 (i.e., the source IAB node) and the IAB node 120-4 (i.e., the target IAB node). The IAB node 120-2 may transmit 4010 the measurement report about the IAB nodes 120-3 and 120-4 to the IAB node 120-3. For example, the measurement report can be transmitted via Radio Resource Control signaling. The IAB node 120-2 may perform any suitable measurement events. For example, the IAB node 120-2 may perform Event A3 where a neighbor cell becomes offset better than a serving cell. Alternatively, the IAB node 120-2 may perform any one of: Event A1 where a serving cell becomes better than a threshold, Event A2 where the serving cell becomes worse than a threshold, Event A4 where the neighbor cell becomes better than a threshold, Event A5 wherein the serving cell becomes worse than threshold 1 and the neighbor cell becomes better than threshold A2, Event B1 wherein inter RAT neighbor becomes better than a threshold, and Event B2 where the serving cell becomes worse than threshold 1 and inter RAT neighbor becomes better than threshold 2. In some embodiments, the IAB node 120-2 may measure a reference signal received power. Alternatively, the IAB node 120-2 may measure a reference signal receiving quality. The IAB node 120-2 may measure any suitable parameters.

The IAB node 120-2 may encapsulate the RRC message into a F1-AP message. The IAB node 120-3 may transfer 4015 the F1-AP message which comprises the RRC container which contains the measurement report to the donor 130-1. The donor 130-1 may make 4020 the conditional handover decision. For example, the donor 130-1 may determine that the IAB node 120-2 needs to be handed over from the IAB node 120-3 to the IAB node 120-4. Further, the donor 130-1 may also determine that one or more descendant nodes (for example, the IAB node 120-1 and the terminal device 110-1) of the IAB node 120-2 need to be handed over from the IAB node 120-3 to the IAB node 120-4.

The donor 130-1 may transmit 4025 a handover request for the IAB node 120-2 to the donor 130-2. The donor 130-1 may transmit 4030 a handover request for the IAB node 120-1 to the donor 130-2. The handover request may comprise one or more of: an identity of the IAB node 120-1, security information of the donor 130-1, and the BH routing information. With the routing information, the donor 130-2 can find the path to reach the IAB 120-2. With the security information of the donor 130-1, the donor 130-2 can send RRC message to the IAB node 120-1. The donor 130-1 may transmit 4035 a handover request for the terminal device 110-1 to the donor 130-2. The handover request may comprise one or more of: an identity of the terminal device 110-1, security information of the donor 130-1, and an address of the terminal device 110-1. With the address, the donor 130-2 can find the path to reach the terminal device 110-1. With the security information of the donor 130-1, the donor 130-2 may send RRC message to the terminal device 110-1.

The donor 130-2 may transmit 4040 a handover request acknowledgment to the donor 130-1 for the IAB node 120-2 only. The donor 130-1 may transmit 4045 the RRCReconfiguration to the IAB node 120-3. The IAB node 120-3 may transmit 4050 the RRCReconfiguration to the IAB node 120-2. The IAB node 120-2 may transmit 4055 a response to the IAB node 120-3.

The IAB node 120-2 may receive a configuration from the donor 130-1. The configuration may comprise a condition for performing the conditional handover. The condition may be any suitable conditions for triggering handover. If the condition is fulfilled, the IAB node 120-2 may perform 4065 handover from the IAB node 120-3 to the IAB node 120-4. The IAB node 120-2 may transmit a RRCReconfigurationComplete message to the donor 130-2. For example, the IAB node 120-2 may transmit 4070 the RRCReconfigurationComplete message to the IAB node 130-4 and the IAB node 130-4 may transfer 4075 a F1-AP message which comprises the RRC container which contains the RRCReconfigurationComplete message to the donor 130-2.

Upon the reception of RRCReconfigurationComplete from the IAB node 120-2, the donor 130-2 may understand that the IAB node 120-2 has completed CHO. The donor 130-2 may skip 4080 all handover request ACK messages for all UEs/IABs (for example, the IAB node 120-1 and the terminal device 110-1) which are the descendant nodes of the IAB node 120-2.

The donor 130-2 may transmit 4085 the DL RRC message associated with the IAB node 120-1 to the IAB node 120-2. The IAB node 120-2 may transmit 4090 RRCReconfiguration to the IAB node 120-1. The IAB node 120-1 may transmit 4095 a RRCReconfiguration complete message to the IAB node 120-2.

The donor 130-2 may transmit 4105 the DL RRC message associated with the terminal device 110-1 to the IAB node 120-1. The IAB node 120-1 may transmit 4110 RRCReconfiguration to the terminal device 110-1. The terminal device 110-1 may transmit 4115 a RRCReconfiguration complete message to the IAB node 120-1.

Figure 5:
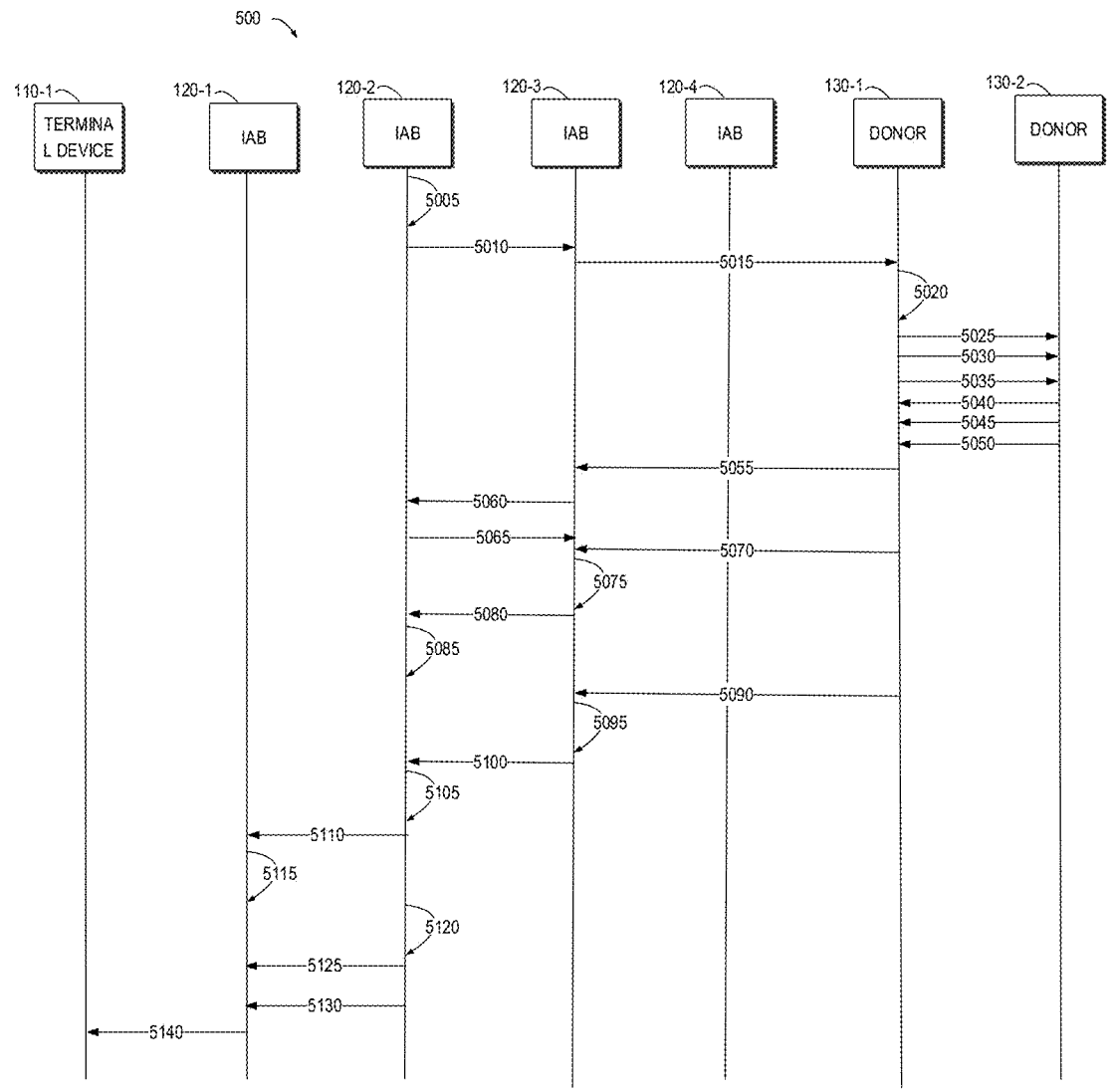
FIG. 5 illustrates a signaling flow for handover according to some embodiments of the present disclosure.

Embodiments of the present disclosure will be described in detail below. Reference is first made to FIG. 5, which shows a signaling chart illustrating process 500 among devices according to some example embodiments of the present disclosure. Only for the purpose of discussion, the process 500 will be described with reference to FIG. 1. The process 500 may involve the terminal device 110-1, the IAB node 120-1, the IAB node 120-2, the IAB node 120-3, the IAB node 120-4, the donor 130-1 and the donor 130-2 in FIG. 1. FIG. 5 shows the process 500 according to embodiments of the present disclosure where the message is able to control the CHO.

The IAB node 120-2 may perform 5005 measurements for the IAB node 120-3 (i.e., the source IAB node) and the IAB node 120-4 (i.e., the target IAB node). The IAB node 120-2 may transmit 5010 the measurement report about the IAB nodes 120-3 and 120-4 to the IAB node 120-3. For example, the measurement report can be transmitted via Radio Resource Control signaling. The IAB node 120-2 may perform any suitable measurement events. For example, the IAB node 120-2 may perform Event A3 where a neighbor cell becomes offset better than a serving cell. Alternatively, the IAB node 120-2 may perform any one of: Event A1 where a serving cell becomes better than a threshold, Event A2 where the serving cell becomes worse than a threshold, Event A4 where the neighbor cell becomes better than a threshold, Event A5 wherein the serving cell becomes worse than threshold 1 and the neighbor cell becomes better than threshold A2, Event B1 wherein inter RAT neighbor becomes better than a threshold, and Event B2 where the serving cell becomes worse than threshold 1 and inter RAT neighbor becomes better than threshold 2. In some embodiments, the IAB node 120-2 may measure a reference signal received power. Alternatively, the IAB node 120-2 may measure a reference signal receiving quality. The IAB node 120-2 may measure any suitable parameters.

The IAB node 120-2 may encapsulate the RRC message into a F1-AP message. The IAB node 120-3 may transfer 5015 the F1-AP message which comprises the RRC container which contains the measurement report to the donor 130-1. The donor 130-1 may make 5020 the conditional handover decision. For example, the donor 130-1 may determine that the IAB node 120-2 needs to be handed over from the IAB node 120-3 to the IAB node 120-4. Further, the donor 130-1 may also determine that one or more descendant nodes (for example, the IAB node 120-1 and the terminal device 110-1) of the IAB node 120-2 need to be handed over from the IAB node 120-3 to the IAB node 120-4.

The donor 130-1 may transmit 5025 a handover request for the IAB node 120-2 to the donor 130-2. The donor 130-1 may transmit 5030 a handover request for the IAB node 120-1 to the donor 130-2. The donor 130-1 may transmit 5035 a handover request for the terminal device 110-1 to the donor 130-2.

The donor 130-2 may transmit 5040 a handover request acknowledgment to the donor 130-1 for the IAB node 120-2. The donor 130-2 may transmit 5045 a handover request acknowledgment to the donor 130-1 for the IAB node 120-1. The donor 130-2 may transmit 5050 a handover request acknowledgment to the donor 130-1 for the terminal device 110-1.

The donor 130-1 may transmit 5055 DL RRC message transfer to the IAB node 120-3 for the IAB node 120-2. The IAB node 120-3 may transmit 5060 the RRCReconfiguration to the IAB node 120-2. The RRCReconfiguration may comprise the condition for CHO execution. The IAB node 120-2 may transmit 5065 the RRCReconfiguration complete message to the IAB node 120-3.

Figure 6:
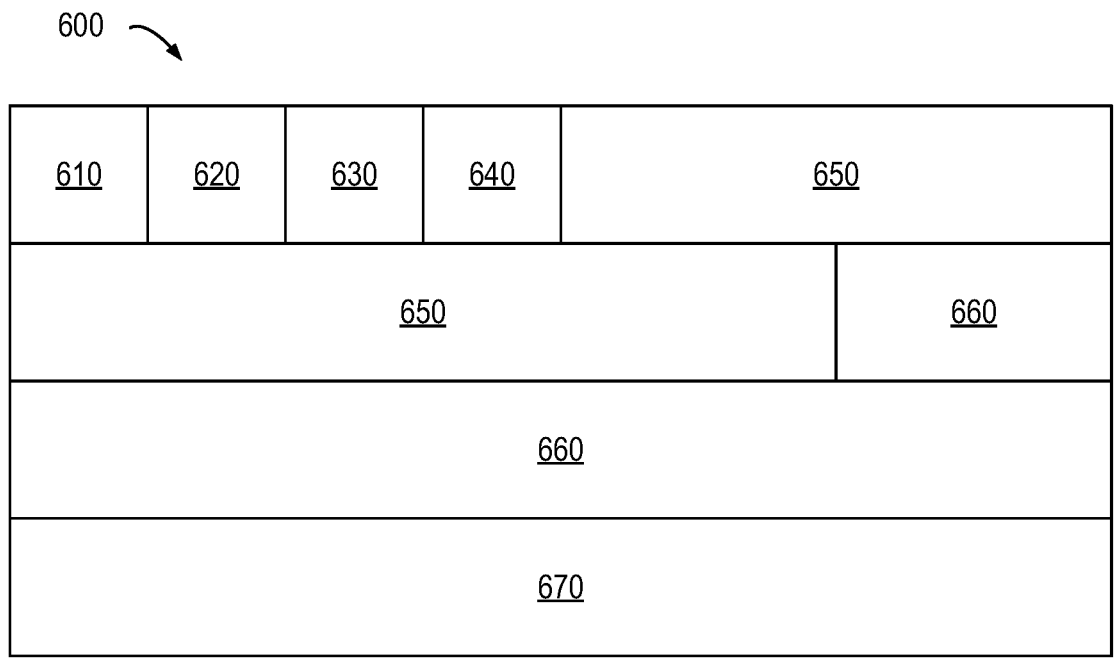
FIG. 6 illustrates a simplified block diagram of a structure of a message according to some embodiments of the present disclosure.

The donor 130-1 may transmit 5070 a message associated with the IAB node 120-1 (for example, BAP packet) to the IAB node 120-3. The message may comprise the destination address of the IAB node 120-2, the DL RRC message and the indication of the CHO. FIG. 6 illustrates a schematic diagram of a structure of the message 600 according to some embodiments of the present disclosure.

As shown in FIG. 6, the message may comprise a field 610 which indicates whether the message is a control message or a data message. The message may also comprise reserved bits 620 and 630. The message may further comprise a field 640 which is used to indicate the CHO at the ancestor node. The message may comprise a field 650 which indicates the destination address of the message. The message may comprise a field 660 which indicates the path of the message. The message may comprise a field 670 which carries data.

Referring back to FIG. 5, the IAB node 120-3 determine 5075 whether the destination address in the field 650 matches with the IAB node 120-3. If the destination address is related to the IAB node 120-2, the IAB node 120-3 may transmit 5080 the message to the IAB node 120-2. Since the destination address in the message matches with the IAB node 120-2, the IAB node 120-2 may hold 5085 the RRC message.

The donor 130-1 may transmit 5090 a message associated with the terminal device 110-1 to the IAB node 120-3. The message may comprise the address of the IAB node 120-1, the DL RRC message and the indication of the CHO. The IAB node 120-3 determine 5095 whether the destination address matches with the IAB node 120-3. Since the destination does not match with the IAB node 120-3, the IAB node 120-3 may transmit 5100 the message to the IAB node 120-2. The IAB node 120-2 determine 5105 whether the destination address matches with the IAB node 120-2. Since the destination address does not match with the IAB node 120-2, the IAB node 120-2 may transmit 5110 the message to the IAB node 120-1.

Since the destination does not match with the IAB node 120-1, the IAB node 120-1 may transmit 5110 the message to the IAB node 120-1. Since the destination address matches with the IAB node 120-1, the IAB node 120-1 may hold 5115 the message to the IAB node 120-1.

The IAB node 120-2 may receive a configuration from the donor 130-1. The configuration may comprise a condition for performing the conditional handover. The condition may be any suitable conditions for triggering handover. If the condition is fulfilled, the IAB node 120-2 may perform 5120 handover from the IAB node 120-3 to the IAB node 120-4. After the CHO is completed at the IAB node 120-2, the IAB node 120-2 may transmit 5125 RRCReconfiguration message to the IAB node 120-1.

In some embodiments, after the CHO is completed at the IAB node 120-2, the IAB node 120-2 may transmit 5130 a message to the IAB node 120-1 to indicate the completion of CHO at the IAB node 120-2 and to release the RRCReconfiguration. The IAB node 120-1 may transmit 5140 RRCReconfiguration to the terminal device 110-1. In some embodiments, the RRCReconfiguration may be sent to the terminal device 110-1 after receiving the RRCReconfiguration from the IAB node 120-1. Alternatively, the RRCReconfiguration may be sent to the terminal device 110-1 after receiving the message.

Figure 7:
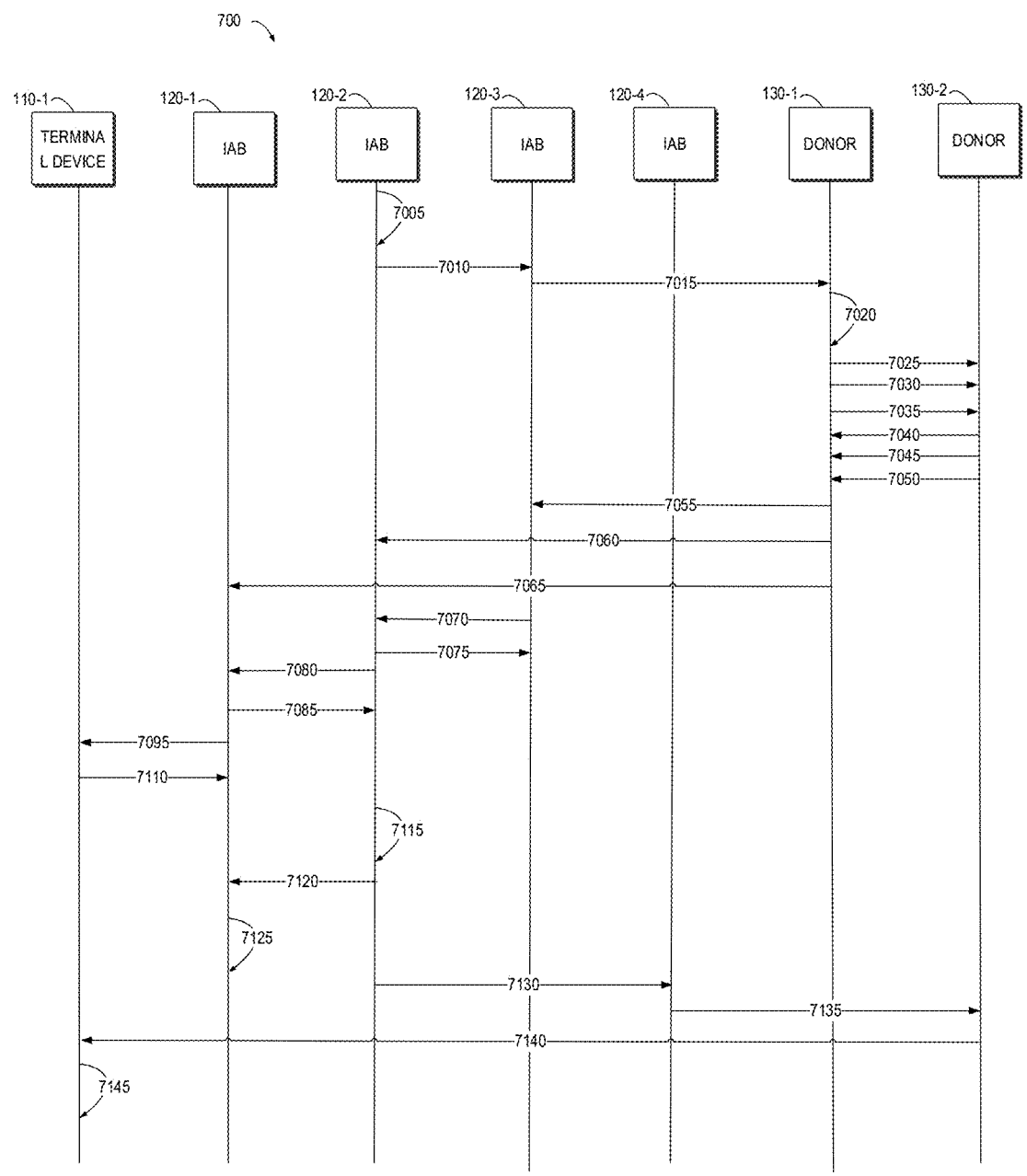
FIG. 7 illustrates a signaling flow for handover according to some embodiments of the present disclosure.

Embodiments of the present disclosure will be described in detail below. Reference is first made to FIG. 7, which shows a signaling chart illustrating process 200 among devices according to some example embodiments of the present disclosure. Only for the purpose of discussion, the process 700 will be described with reference to FIG. 1. The process 700 may involve the terminal device 110-1, the IAB node 120-1, the IAB node 120-2, the IAB node 120-3, the IAB node 120-4, the donor 130-1 and the donor 130-2 in FIG. 1. FIG. 7 shows the process 700 according to embodiments of the present disclosure where the descendant node is able to control the CHO.

The IAB node 120-2 may perform 7005 measurements for the IAB node 120-3 (i.e., the source IAB node) and the IAB node 120-4 (i.e., the target IAB node). The IAB node 120-2 may transmit 7010 the measurement report about the IAB nodes 120-3 and 120-4 to the IAB node 120-3. For example, the measurement report can be transmitted via Radio Resource Control signaling. The IAB node 120-2 may perform any suitable measurement events. For example, the IAB node 120-2 may perform Event A3 where a neighbor cell becomes offset better than a serving cell. Alternatively, the IAB node 120-2 may perform any one of: Event A1 where a serving cell becomes better than a threshold, Event A2 where the serving cell becomes worse than a threshold, Event A4 where the neighbor cell becomes better than a threshold, Event A5 wherein the serving cell becomes worse than threshold 1 and the neighbor cell becomes better than threshold A2, Event B1 wherein inter RAT neighbor becomes better than a threshold, and Event B2 where the serving cell becomes worse than threshold 1 and inter RAT neighbor becomes better than threshold 2. In some embodiments, the IAB node 120-2 may measure a reference signal received power. Alternatively, the IAB node 120-2 may measure a reference signal receiving quality. The IAB node 120-2 may measure any suitable parameters.

The IAB node 120-2 may encapsulate the RRC message into a F1-AP message. The IAB node 120-3 may transfer 7015 the F1-AP message which comprises the RRC container which contains the e measurement report to the donor 130-1. The donor 130-1 may make 7020 the conditional handover decision. For example, the donor 130-1 may determine that the IAB node 120-2 needs to be handed over from the IAB node 120-3 to the IAB node 120-4. Further, the donor 130-1 may also determine that one or more descendant nodes (for example, the IAB node 120-1 and the terminal device 110-1) of the IAB node 120-2 need to be handed over from the IAB node 120-3 to the IAB node 120-4.

The donor 130-1 may transmit 7025 a handover request for the IAB node 120-2 to the donor 130-2. The donor 130-1 may transmit 7030 a handover request for the IAB node 120-1 to the donor 130-2. The donor 130-1 may transmit 7035 a handover request for the terminal device 110-1 to the donor 130-2.

The donor 130-2 may transmit 7040 a handover request acknowledgment to the donor 130-1 for the IAB node 120-2. The donor 130-2 may transmit 7045 a handover request acknowledgment to the donor 130-1 for the IAB node 120-1. The donor 130-2 may transmit 7050 a handover request acknowledgment to the donor 130-1 for the terminal device 110-1.

The donor 130-1 may transmit 7055 downlink RRC message transfer to the IAB node 120-3 for the IAB node 120-2. The donor 130-1 may transmit 7060 downlink RRC message transfer to the IAB node 120-2 for the IAB node 120-1. The donor 130-1 may transmit 7065 downlink RRC message transfer to the IAB node 120-1 for the terminal device 110-1.

The IAB node 120-3 may transmit 7070 the RRCReconfiguration to the IAB node 120-2. The IAB node 120-2 may transmit 7075 the RRCReconfiguration complete message to the IAB node 120-3.

The IAB node 120-2 may transmit 7080 a RRCReconfiguration message to the IAB node 120-1. The RRCReconfiguration message may comprise an indication of the CHO to be performed at an ancestor node. The IAB node 120-1 may transmit 7085 the RRCReconfiguration complete message to the IAB node 120-2. Due to the indication of the CHO, the IAB node 120-1 may not apply the configuration in the RRCReconfiguration message.

The IAB node 120-1 may transmit 7095 a RRCReconfiguration message to the terminal device 110-1. The RRCReconfiguration message may comprise an indication of the CHO to be performed at an ancestor node. The terminal device 110-1 may transmit 7110 the RRCReconfiguration complete message to the IAB node 120-1. Due to the indication of the CHO, the terminal device 110-1 may not apply the configuration in the RRCReconfiguration message.

If the condition is fulfilled, the IAB node 120-2 may perform 7115 handover from the IAB node 120-3 to the IAB node 120-4. After the CHO is completed at the IAB node 120-2, the IAB node 120-2 may transmit 7120 a CHO complete message to the IAB node 120-1. The IAB node 120-1 may apply the configuration received in the RRCReconfiguration message. The IAB node 120-2 may transmit 7130 a RRCReconfiguration complete message to the donor 130-1. The donor 130-1 may transmit 7135 the F1-AP message which comprises the RRCReconfiguration complete message to the donor 130-2.

In some embodiments, after the CHO is completed at the IAB node 120-2, the IAB node 120-2 may transmit the RRCReconfiguration message to the donor 130-2. The donor 130-2 may respond a handover success to the donor 130-1.

The donor 130-2 may transmit 7140 the CHO complete message to the terminal device 110-1. The terminal device 110-1 may apply 7145 the configuration received in the RRCReconfiguration message.

Figure 8:
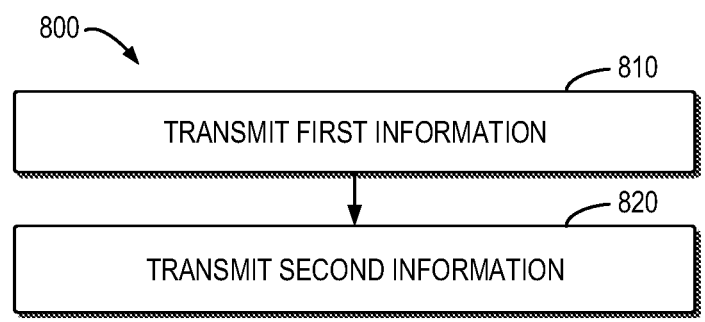
FIG. 8 is a flowchart of an example method in accordance with an embodiment of the present disclosure.

FIG. 8 shows a flowchart of an example method 800 in accordance with an embodiment of the present disclosure. The method 800 can be implemented at any suitable devices. Only for the purpose of illustrations, the method 800 can be implemented at a first device. The first device may refer to different devices according to different embodiments.

At block 810, the first device receives, from a second device, first information associated with a conditional handover through a source Integrated Access Backhaul (IAB) node to a target IAB node.

At block 820, the first device transmits, to a third device, second information associated with the conditional handover if the conditional handover is completed at an ancestor IAB node.

In some embodiments, the first device is the ancestor IAB node (for example, the IAB node 120-2), the second device is a source donor (for example, the donor 130-1) of the source IAB node (for example, the IAB node 120-3), and the third device is a descendant node (for example, the IAB node 120-1 or the terminal device 110-1) of the first device. In some embodiments, the IAB node 120-2 may receive, from the donor 130-1, the first information comprising at least one of: a radio configuration of a target donor of the target IAB node, an identity of the third device, or an indication of the conditional handover to be performed at the ancestor IAB node. In some embodiments, the IAB node 120-2 may receive, from the donor 130-1, a configuration comprising a condition for performing the conditional handover. If the condition is fulfilled, the IAB node 120-2 may perform the conditional handover from the IAB 120-3 node to the IAB 120-4 node. The IAB node 120-2 may apply the radio configuration of the donor 120-4. In some embodiments, the third device may be a further IAB node, for example, the IAB node 120-1, the IAB node 120-2 may transmit a message to the IAB node 120-1 if the conditional handover is completed at the IAB node 120-2. The message may indicate a completion of the conditional handover at the IAB node 120-2. In some embodiments, the second information may comprise a radio configuration of a target donor of the target IAB node.

In some embodiments, the first device is the donor 130-1, the second device is the IAB node 120-2, and the third device is the donor 130-2. In some embodiments, the donor 130-1 may receive the first information comprising a first measurement report for the IAB node 120-3 and a second measurement report for the IAB node 120-4. In some embodiments, the donor 130-1 may transmit, to the donor 130-2, a first handover request for handover the IAB node 120-2 from the IAB node 120-3 to the IAB node 120-4. The donor 130-1 may receive a handover success message from the donor 130-2. If the handover success message indicates a completion of the handover at the IAB node 120-2, the donor 130-1 may transmit, to the donor 130-2, the second information comprising a second handover request for handover a descendant node (for example, the IAB node 120-1 or the terminal device 110-1) of the IAB node 120-2 from the IAB node 120-3 to the target IAB node 120-4. In some embodiments, the second handover request comprises at least one of: an identity of the descendant node (for example, the IAB node 120-1 or the terminal device 110-1), security information of the donor 130-1, a routing information associated with the descendant node (for example, the IAB node 120-1) if the descendant node is an IAB node, or an access node address associated with the descendant node (for example, the terminal device 110-1) if the descendant node is a terminal device.

In some embodiments, the first device is the donor 130-2, the second device is the donor 130-1, and the third device is a descendant node (for example, the IAB node 120-1 and the terminal device 110-1) of the IAB node 120-2. In some embodiments, the donor 130-2 may receive, from the donor 130-1, a first handover request for handover the IAB node 120-2 from the IAB node 120-3 to the IAB node 120-4. In some embodiments, the the donor 130-2 may receive the first information comprising a second handover request for handover a descendant node of the IAB node 120-2 from the IAB node 120-3 to the IAB node 120-4. In some embodiments, the second handover request comprises at least one of: an identity of the descendant node, security information of the donor 130-1, a routing information associated with the descendant node (for example, the IAB node 120-1) if the descendant node is an IAB node, or an access node address associated with the descendant node (for example, the terminal device 110-1) if the descendant node is a terminal device. In some embodiments, the donor 130-2 may transmit, to the donor 130-1, a first handover request acknowledgment comprising a radio configuration of the first device. In some embodiments, the donor 130-2 may receive, from the IAB node 120-2, a reconfiguration complete message. If the reconfiguration complete message indicates a completion of the conditional handover at the IAB node 120-1, the donor 130-2 may transmit, to the third device (for example, the IAB node 120-1 and the terminal device 110-1), the second information comprising the radio configuration of the first device.

In some embodiments, the first device is the IAB node 120-2, the second device is the IAB node 120-3 or the donor 130-1, and the third device is a descendant node (for example, the IAB node 120-1 and the terminal device 110-1) of the IAB node 120-2. In some embodiments, the IAB node 120-2 may receive the first information in a backhaul adaption protocol (BAP) packet. The BAP packet may comprise at least one of: a radio configuration of the donor 130-2, a destination address, or an indication of the conditional handover to be performed at the IAB node 120-2. If the destination address matches with the IAB node 120-2, the IAB node 120-2 may perform the conditional handover from the IAB node 120-3 to the IAB node 120-4. The IAB node 120-2 may apply the radio configuration of the donor 130-2. In some embodiments, the IAB node 120-2 may transmit the second information comprising a radio configuration of a target donor of the IAB node 120-4. If the destination address mismatches with the first device, the IAB node 120-2 may forward the BAP packet to the third device (for example, the IAB node 120-1 and the terminal device 110-1). In some embodiments, the third device is a further IAB node (for example, the IAB node 120-1), if the conditional handover is completed at the IAB node 120-2, the IAB node 120-2 may transmit a backhaul adaption protocol (BAP) message to the IAB node 120-1. The BAP message may indicate a completion of the conditional handover at the IAB node 120-2.

In some embodiments, the first device is the IAB node 120-2, the second device is the donor 130-1, and the third device is a descendant node (for example, the IAB node 120-1 and the terminal device 110-1) of the IAB node 120-2. In some embodiments where the third device is the IAB node 120-1, the IAB node 120-2 may transmit, to the IAB node 120-1, the first information comprising at least one of: a radio configuration of the donor 130-2, an identity of the IAB node 120-1, or an indication of the conditional handover to be performed at the IAB node 120-2. In som2 embodiments, the IAB node 120-2 may transmit the second information comprising an indication of a completion of the conditional handover at the first device if the conditional handover is completed at the IAB node 120-2.

Figure 9:
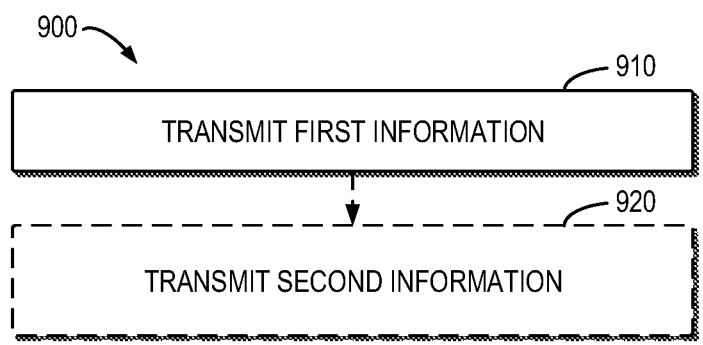
FIG. 9 is a flowchart of an example method in accordance with an embodiment of the present disclosure.

FIG. 9 shows a flowchart of an example method 900 in accordance with an embodiment of the present disclosure. The method 900 can be implemented at any suitable devices. Only for the purpose of illustrations, the method 800 can be implemented at a second device. The second device may refer to different devices according to different embodiments.

At block 910, the second device transmits, to a first device, first information associated with a conditional handover from a source Integrated Access Backhaul (IAB) node to a target IAB node.

In some embodiments, the first device is the IAB node 120-2 and the second device is the donor 130-1. In some embodiments, the donor 130-1 transmits the first information comprising at least one of: a radio configuration of the donor 130-2, an identity of a descendant node (for example, the IAB node 120-1 or the terminal device 110-1) of the IAB node 120-2, or an indication of the conditional handover to be performed at the IAB node 120-2. In some embodiments, the donor 130-1 may transmit the first information comprising at least one of: a radio configuration of the donor 130-2, an identity of a descendant node (for example, the IAB node 120-1 or the terminal device 110-1) of the IAB node 120-2, or an indication of the conditional handover to be performed at the IAB node 120-2. In some embodiments, at block 920, the donor 130-1 may transmit second information to a descendant node of the IAB node 120-2. The second information may comprise at least one of: a radio configuration of the donor 130-2, an identity of a third device which is a descendant node of the IAB node 120-2, or an indication of the conditional handover to be performed at the IAB node 120-2.

In some embodiments, the first device is the donor 130-2 and the second device is the donor 130-1. In some embodiments, the donor 130-1 may transmit, to the donor 130-2, a first handover request for handover the IAB node 120-2 from the IAB node 120-3 to the IAB node 120-4. In some embodiments, the donor 130-1 may transmit the first information comprising a second handover request for handover a descendant node of the IAB node 120-2 from the IAB node 120-3 to the IAB node 120-4. In some embodiments, the second handover request comprises at least one of: an identity of the descendant node, security information of the donor 130-1, routing information associated with the descendant node if the descendant node is an IAB node, or an access node address associated with the descendant node if the descendant node is a terminal device. In some embodiments, the donor 130-1 may receive, from the donor 130-2, a first handover request acknowledgment comprising a radio configuration of the donor 130-2.

In some embodiments, the first device is the IAB node 120-2, and the second device is the IAB node 120-3 or the donor 130-1. In some embodiments where the second device is the IAB node 120-3, the IAB node 120-3 may transmit the first information in a backhaul adaption protocol (BAP) packet, the BAP packet comprising at least one of: a radio configuration of the donor 130-2, a destination address, or an indication of the conditional handover to be performed at the IAB node 120-2. In some embodiments where the second device is the IAB node 120-3, the IAB node 120-3 may receive, from the donor 130-1, the first information in a backhaul adaption protocol (BAP) packet. The BAP packet may comprise at least one of: a radio configuration of the donor 130-2, a destination address, or n indication of the conditional handover to be performed at the IAB node 120-2. In some embodiments, if the destination address mismatches with the second device, the second device may forward the BAP packet to a descendant node of the IAB node 120-2.

Figure 10:
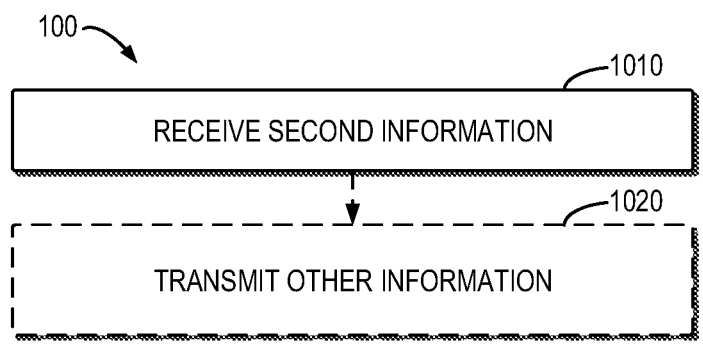
FIG. 10 is a flowchart of an example method in accordance with an embodiment of the present disclosure.

FIG. 10 shows a flowchart of an example method 800 in accordance with an embodiment of the present disclosure. The method 800 can be implemented at any suitable devices. Only for the purpose of illustrations, the method 800 can be implemented at a terminal device 110-1 as shown in FIG. 1. Only for the purpose of illustrations, the method 1000 can be implemented at a third device. The third device may refer to different devices according to different embodiments.

At block 1010, the third device receives, from a second device, second information associated with the conditional handover if a conditional handover from a source Integrated Access Backhaul (IAB) node to a target IAB node is completed at an ancestor IAB node.

In some embodiments, the second device is the donor 130-1, and the third device is a descendant node (for example, the IAB node 120-1 or the terminal device 110-1) of the IAB node 120-2. In some embodiments, the third device may receive the second information comprising a radio configuration of the donor 130-2. The third device may apply the radio configuration of the donor 130-2. In some embodiments where the third device is a further IAB node (for example, the IAB node 120-1), the IAB node 120-1 may receive a message from the donor 130-1 if the conditional handover is completed at the IAB node 120-2. The message may indicate a completion of the conditional handover at the IAB node 120-2. In some embodiments, the third device may transmit, at block 1020, the radio configuration of the donor 130-2 to a descendant node of the third device.

In some embodiments, the second device is the IAB node 120-2, and the third device is the donor 130-2. In some embodiments, the donor 130-2 may receive, from the donor 130-1, a first handover request for handover the ancestor IAB node from the source IAB node to the target IAB node. The donor 130-2 may transmit a handover success message to the donor 130-1. In some embodiments, if the handover success message indicates a completion of the handover at the IAB node 120-2, the donor 130-2 may receive, from the IAB node 120-2, the second information comprising a second handover request for handover a descendant node of the IAB node 120-2 from the IAB node 120-3 to the IAB node 120-4. In some embodiments, the donor 130-2 may transmit, to the descendant node, a radio configuration of the donor 130-2 and the donor 130-2 may cause a second handover request for the second handover request to be skipped. In some embodiments, the second handover request comprises at least one of: an identity of the descendant node, security information of the donor 130-1, routing information associated with the descendant node if the descendant node is an IAB node, or an access node address associated with the descendant node if the descendant node is a terminal device. In some embodiments, the donor 130-2 may determine a path to the descendant node based on the routing information or the access node address and transmit a radio resource control (RRC) message to the descendant node based on the security information of the donor 130-1.

In some embodiments, the second device is the IAB node 120-3 or the donor 130-1 and the third device is a descendant node of the IAB node 120-2. In some embodiments, the third device may receive the second information comprising a radio configuration of the donor 130-2. In some embodiments, if the destination address mismatches with the IAB node 120-2, the third device may receive the BAP packet from the ancestor IAB node. In some embodiments where the third device is a further IAB node, the third device may receive a backhaul adaption protocol (BAP) message from the IAB node 120-2 if the conditional handover is completed at the IAB node 120-2. The BAP message may indicate a completion of the conditional handover at the IAB node 120-2. In some embodiments, the third device may transmit the radio configuration of the donor 130-2 to a descendant node of the third device.

In some embodiments, the second device is the donor 130-2 and the third device is a descendant node of the IAB node 120-2 or the donor 130-2. In some embodiments where the third device is the descendant node, the third device may receive, from the IAB node 120-2, first information comprising at least one of: a radio configuration of the donor 130-2, an identity of the third device, or an indication of the conditional handover to be performed at the IAB node 120-2. In some embodiments, the third device is the descendant node, the third device may receive, from the donor 130-2 or the IAB node 120-2, an indication of a completion of the conditional handover at the IAB node 120-2 if the conditional handover is completed at the IAB node 120-2. The third device may apply the radio configuration of the donor 130-2.

Figure 11:
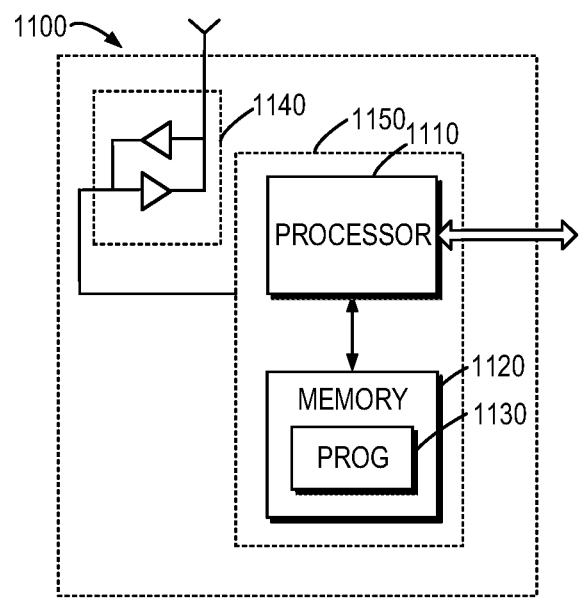
FIG. 11 is a simplified block diagram of a device that is suitable for implementing embodiments of the present disclosure.

FIG. 11 is a simplified block diagram of a device 1100 that is suitable for implementing embodiments of the present disclosure. The device 1100 can be considered as a further example implementation of the terminal device, the IAB node 120 or the donor as shown in FIG. 1. Accordingly, the device 1100 can be implemented at or as at least a part of the terminal device, the IAB node 120 or the donor.

As shown, the device 1100 includes a processor 1100, a memory 1120 coupled to the processor 1100, a suitable transmitter (TX) and receiver (RX) 1140 coupled to the processor 1100, and a communication interface coupled to the TX/RX 1140. The memory 1120 stores at least a part of a program 1130. The TX/RX 1140 is for bidirectional communications. The TX/RX 1140 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1130 is assumed to include program instructions that, when executed by the associated processor 1100, enable the device 1000 to operate in accordance with the embodiments of the present disclosure, as discussed herein with reference to FIGS. 2 to 9. The embodiments herein may be implemented by computer software executable by the processor 1100 of the device 1000, or by hardware, or by a combination of software and hardware. The processor 1100 may be configured to implement various embodiments of the present disclosure. Furthermore, a combination of the processor 1100 and memory 1120 may form processing means 850 adapted to implement various embodiments of the present disclosure.

The memory 1120 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 1120 is shown in the device 1100, there may be several physically distinct memory modules in the device 1100. The processor 1100 may be of any type suitable to the local technical network, and may include one or more of general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

In some embodiments, a first device comprises circuitry configured to: receive, at a first device and from a second device, first information associated with a conditional handover through a source Integrated Access Backhaul (IAB) node to a target IAB node; and in accordance with a determination that the conditional handover is completed at an ancestor IAB node, transmit, to a third device, second information associated with the conditional handover.

In some embodiments, wherein the first device is the ancestor IAB node, the second device is a source donor of the source IAB node, and the third device is a descendant node of the first device.

In some embodiments, the first device comprises circuitry configured to: receive the first information by: receiving the first information comprising at least one of: a radio configuration of a target donor of the target IAB node, an identity of the third device, or an indication of the conditional handover to be performed at the ancestor IAB node.

In some embodiments, the first device comprises circuitry configured to: receive, from a source donor of the source IAB node, a configuration comprising a condition for performing the conditional handover; in accordance with a determination that the condition is fulfilled, perform the conditional handover from the source IAB node to the target IAB node; and apply the radio configuration of the target donor.

In some embodiments, the third device is a further IAB node, and w the first device comprises circuitry configured to: in accordance with a determination that the conditional handover is completed at the first device, transmit a message to the third device, the message indicating a completion of the conditional handover at the first device.

In some embodiments, the first device comprises circuitry configured to: transmit the second information by transmitting the second information comprising a radio configuration of a target donor of the target IAB node.

In some embodiments, the first device is a source donor of the source IAB node, the second device is the ancestor IAB node, and the third device is a target donor of the target IAB node.

In some embodiments, the first device comprises circuitry configured to: receive the first information by: receiving the first information comprising a first measurement report for the source IAB node and a second measurement report for the target IAB node.

In some embodiments, the first device comprises circuitry configured to: transmit, to the third device, a first handover request for handover the ancestor IAB node from the source IAB node to the target IAB node; and receive a handover success message from the third device. The first device comprises circuitry configured to transmit the second information by: in accordance with a determination that the handover success message indicates a completion of the handover at the ancestor IAB node, transmitting, to the third device, the second information comprising a second handover request for handover a descendant node of the ancestor IAB node from the source IAB node to the target IAB node.

In some embodiments, the second handover request comprises at least one of: an identity of the descendant node, security information of the first device, routing information associated with the descendant node if the descendant node is an IAB node, or an access node address associated with the descendant node if the descendant node is a terminal device.

In some embodiments, the first device is a target donor of the target IAB node, the second device is a source donor of the source IAB node, and the third device is a descendant node of the ancestor IAB node.

In some embodiments, the first device comprises circuitry configured to: receive, from the second device, a first handover request for handover the ancestor IAB node from the source IAB node to the target IAB node, and In some embodiments, the first device comprises circuitry configured to: receiving receive information by receiving, from the second device, the first information comprising a second handover request for handover a descendant node of the ancestor IAB node from the source IAB node to the target IAB node.

In some embodiments, the second handover request comprises at least one of: an identity of the descendant node, security information of the second device, a routing information associated with the descendant node if the descendant node is an IAB node, or an access node address associated with the descendant node if the descendant node is a terminal device.

In some embodiments, the first device comprises circuitry configured to: transmit, to the second device, a first handover request acknowledgment comprising a radio configuration of the first device; receive, from the ancestor IAB node, a reconfiguration complete message, and the first device comprises circuitry configured to: transmit the second information by in accordance with a determination that the reconfiguration complete message indicates a completion of the conditional handover at the ancestor IAB node, transmitting, to the third device, the second information comprising the radio configuration of the first device.

In some embodiments, the first device is the ancestor IAB node, the second device is the source IAB node or a source donor of the source IAB node, and the third device is a descendant node of the ancestor IAB node.

In some embodiments, the first device comprises circuitry configured to receive the first information by receiving the first information in a backhaul adaption protocol (BAP) packet, the BAP packet comprising at least one of: a radio configuration of a target donor of the target IAB node, a destination address, or an indication of the conditional handover to be performed at the ancestor IAB node.

In some embodiments, the first device comprises circuitry configured to in accordance with a determination that the destination address matches with the first device, perform the conditional handover from the source IAB node to the target IAB node; and apply the radio configuration of the target donor.

In some embodiments, the first device comprises circuitry configured to transmit the second information by: transmitting the second information comprising a radio configuration of a target donor of the target IAB node.

In some embodiments, the first device comprises circuitry configured to in accordance with a determination that the destination address mismatches with the first device, forward the BAP packet to the third device.

In some embodiments, the third device is a further IAB node, and, the first device comprises circuitry configured to in accordance with a determination that the conditional handover is completed at the first device, transmit a backhaul adaption protocol (BAP) message to the third device, the BAP message indicating a completion of the conditional handover at the first device.

In some embodiments, the first device is the ancestor IAB node, the second device is a source donor of the source IAB node, and the third device is a descendant node of the first device or a target donor of the target IAB node.

In some embodiments, the third device is the descendant node and the first device comprises circuitry configured to transmit, to the third device, the first information comprising at least one of: a radio configuration of a target donor of the target IAB node, an identity of the third device, or an indication of the conditional handover to be performed at the ancestor IAB node.

the first device comprises circuitry configured to transmit the second information by: in accordance with a determination that the conditional handover is completed at the first device, transmitting the second information comprising an indication of a completion of the conditional handover at the first device.

In some embodiments, a second device comprises circuitry configured to: transmit, at a second device and to a first device, first information associated with a conditional handover from a source Integrated Access Backhaul (IAB) node to a target IAB node.

In some embodiments, the first device is the ancestor IAB node, and the second device is a source donor of the source IAB node.

In some embodiments, the second device comprises circuitry configured to transmit the first information comprises by transmitting the first information comprising at least one of: a radio configuration of a target donor of the target IAB node, an identity of a descendant node of the first device, or an indication of the conditional handover to be performed at the ancestor IAB node.

In some embodiments, the second device comprises circuitry configured to transmit second information to a descendant node of the first device, the second information comprising at least one of: a radio configuration of a target donor of the target IAB node, an identity of a third device which is a descendant node of the first device, or an indication of the conditional handover to be performed at the ancestor IAB node.

In some embodiments, the first device is a target donor of the target IAB node, and the second device is a source donor of the source IAB node.

In some embodiments, the second device comprises circuitry configured to transmit, to the first device, a first handover request for handover the ancestor IAB node from the source IAB node to the target IAB node, and the second device comprises circuitry configured to transmit first information by: transmitting the first information comprising a second handover request for handover a descendant node of the ancestor IAB node from the source IAB node to the target IAB node.

In some embodiments, the second handover request comprises at least one of: an identity of the descendant node, security information of the second device, a routing information associated with the descendant node if the descendant node is an IAB node, or an access node address associated with the descendant node if the descendant node is a terminal device.

In some embodiments, the second device comprises circuitry configured to receive, from the first device, a first handover request acknowledgment comprising a radio configuration of the first device.

In some embodiments, the first device is the ancestor IAB node, and the second device is the source IAB node or a source donor of the source IAB node.

In some embodiments, the second device is the source IAB node, the second device comprises circuitry configured to transmit the first information by: transmitting the first information in a backhaul adaption protocol (BAP) packet, the BAP packet comprising at least one of: a radio configuration of a target donor of the target IAB node, a destination address, or an indication of the conditional handover to be performed at the ancestor IAB node.

In some embodiments, the second device is the source IAB node, and the second device comprises circuitry configured to receive, from a source donor of the second device, the first information in a backhaul adaption protocol (BAP) packet, the BAP packet comprising at least one of: a radio configuration of a target donor of the target IAB node, a destination address, or an indication of the conditional handover to be performed at the ancestor IAB node.

In some embodiments, the second device comprises circuitry configured to in accordance with a determination that the destination address mismatches with the second device, forward the BAP packet to a descendant node of the first device.

In some embodiments, a third device comprises circuitry configured to: in accordance with a determination that a conditional handover from a source Integrated Access Backhaul (IAB) node to a target IAB node is completed at an ancestor IAB node, receive, and from a second device, second information associated with the conditional handover.

In some embodiments, the second device is a source donor of the source IAB node, and the third device is a descendant node of the ancestor IAB node.

In some embodiments, the third device comprises circuitry configured to receive the second information by receiving the second information comprising a radio configuration of a target donor of the target IAB node; and applying the radio configuration of the target donor of the target IAB node.

In some embodiments, the third device is a further IAB node and the third device comprises circuitry configured to in accordance with a determination that the conditional handover is completed at the first device, receive a message from the second device, the message indicating a completion of the conditional handover at the first device.

In some embodiments, the third device comprises circuitry configured to transmit the radio configuration of the target donor of the target IAB node to a descendant node of the third device.

In some embodiments, the second device is the ancestor IAB node, and the third device is a target donor of the target IAB node.

In some embodiments, the third device comprises circuitry configured to receive, from a source donor of the source IAB node, a first handover request for handover the ancestor IAB node from the source IAB node to the target IAB node; and transmit a handover success message to the source donor. The third device comprises circuitry configured to receive the second information by in accordance with a determination that the handover success message indicates a completion of the handover at the ancestor IAB node, receiving, from the second device, the second information comprising a second handover request for handover a descendant node of the ancestor IAB node from the source IAB node to the target IAB node.

In some embodiments, the third device comprises circuitry configured to transmit, to the descendant node, a radio configuration of the third device; and cause a second handover request for the second handover request to be skipped.

In some embodiments, the second handover request comprises at least one of: an identity of the descendant node, security information of a source donor of the source IAB node, a routing information associated with the descendant node if the descendant node is an IAB node, or an access node address associated with the descendant node if the descendant node is a terminal device.

In some embodiments, the third device comprises circuitry configured to determine a path to the descendant node based on the routing information or the access node address; and transmit a radio resource control (RRC) message to the descendant node based on the security information of the source donor.

In some embodiments, the second device is the source IAB node or a source donor of the source IAB node, and the third device is a descendant node of the ancestor IAB node.

In some embodiments, the third device comprises circuitry configured to receive the second information by receiving the second information comprising a radio configuration of a target donor of the target IAB node.

In some embodiments, the third device comprises circuitry configured to in accordance with a determination that the destination address mismatches with the ancestor IAB node, receive the BAP packet from the ancestor IAB node.

In some embodiments, the third device is a further IAB node and the third device comprises circuitry configured to in accordance with a determination that the conditional handover is completed at the ancestor IAB node, receive a backhaul adaption protocol (BAP) message from the ancestor IAB node, the BAP message indicating a completion of the conditional handover at the ancestor IAB node.

In some embodiments, the third device comprises circuitry configured to transmit the radio configuration of the target donor of the target IAB node to a descendant node of the third device.

In some embodiments, the second device is a source donor of the source IAB node, and the third device is a descendant node of the ancestor IAB node or a target donor of the target IAB node.

In some embodiments, the third device is the descendant node and the third device comprises circuitry configured to receive from the ancestor IAB node, first information comprising at least one of: a radio configuration of a target donor of the target IAB node, an identity of the third device, or an indication of the conditional handover to be performed at the ancestor IAB node.

In some embodiments, the third device is the descendant node and the third device comprises circuitry configured to in accordance with a determination that the conditional handover is completed at the ancestor IAB node, receive, from a target donor of the target IAB node or the ancestor IAB node, an indication of a completion of the conditional handover at the ancestor IAB node; and apply the radio configuration of the target donor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 4-10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A communication method, comprising:
   receiving, at a first device and from a second device, first information associated with a conditional handover through a source Integrated Access Backhaul (IAB) node to a target IAB node;
   in accordance with a determination that the conditional handover is completed at an ancestor IAB node, transmitting, to a third device, second information associated with the conditional handover, wherein the first device is a source donor of the source IAB node, the second device is the ancestor IAB node, and the third device is a target donor of the target IAB node;
   transmitting, to the third device, a first handover request for handover the ancestor IAB node from the source IAB node to the target IAB node; and
   receiving a handover success message from the third device,
   wherein the transmitting the second information comprises:
      in accordance with a determination that the handover success message indicates a completion of the handover at the ancestor IAB node, transmitting, to the third device, the second information comprising a second handover request for handover a descendant node of the ancestor IAB node from the source IAB node to the target IAB node.

2. The method of claim 1, wherein the first device is the ancestor IAB node, the second device is a source donor of the source IAB node, and the third device is a descendant node of the first device.

3. The method of claim 2, wherein receiving the first information comprises:
receiving the first information comprising at least one of:
a radio configuration of a target donor of the target IAB node,
an identity of the third device, or
an indication of the conditional handover to be performed at the ancestor IAB node.

4. The method of claim 2, further comprising:
receiving, from a source donor of the source IAB node, a configuration comprising a condition for performing the conditional handover;
in accordance with a determination that the condition is fulfilled, performing the conditional handover from the source IAB node to the target IAB node; and
applying a radio configuration of the target donor.

5. The method of claim 2, wherein the third device is a further IAB node, and wherein the method further comprises:
in accordance with a determination that the conditional handover is completed at the first device, transmitting a message to the third device, the message indicating a completion of the conditional handover at the first device.

6. The method of claim 1, wherein the second handover request comprises at least one of:
an identity of the descendant node,
security information of the first device,
routing information associated with the descendant node if the descendant node is an IAB node, or
an access node address associated with the descendant node if the descendant node is a terminal device.

7. The method of claim 1, wherein the first device is a target donor of the target IAB node, the second device is a source donor of the source IAB node, and the third device is a descendant node of the ancestor IAB node.

8. The method of claim 7, further comprising:
receiving, from the second device, the first handover request for handover the ancestor IAB node from the source IAB node to the target IAB node, and wherein receiving the first information comprises:
receiving, from the second device, the first information comprising a second handover request for handover a descendant node of the ancestor IAB node from the source IAB node to the target IAB node.

9. The method of claim 8, wherein the second handover request comprises at least one of:
an identity of the descendant node,
security information of the second device,
routing information associated with the descendant node if the descendant node is an IAB node, or
an access node address associated with the descendant node if the descendant node is a terminal device.

10. The method of claim 8, further comprising
transmitting, to the second device, a first handover request acknowledgment comprising a radio configuration of the first device;
receiving, from the ancestor IAB node, a reconfiguration complete message, and wherein transmitting the second information comprises
in accordance with a determination that the reconfiguration complete message indicates a completion of the conditional handover at the ancestor IAB node, transmitting, to the third device, the second information comprising the radio configuration of the first device.

11. A first device, comprising:
a processor configured to cause the first device to:
receive from a second device, first information associated with a conditional handover through a source Integrated Access Backhaul (IAB) node to a target IAB node;
in accordance with a determination that the conditional handover is completed at an ancestor IAB node, transmit, to a third device, second information associated with the conditional handover, wherein the first device is a source donor of the source IAB node, the second device is the ancestor IAB node, and the third device is a target donor of the target IAB node;
transmit, to the third device, a first handover request for handover the ancestor IAB node from the source IAB node to the target IAB node;
receive a handover success message from the third device, and
in accordance with a determination that the handover success message indicates a completion of the handover at the ancestor IAB node, transmit, to the third device, the second information comprising a second handover request for handover a descendant node of the ancestor IAB node from the source IAB node to the target IAB node.

* * * * *